United States Patent
Ding et al.

(10) Patent No.: US 11,627,507 B2
(45) Date of Patent: *Apr. 11, 2023

(54) NETWORK HANDOVER METHOD AND APPARATUS

(71) Applicant: Huawei Technologies Co., Ltd., Shenzhen (CN)

(72) Inventors: Ji Ding, Shanghai (CN); Tongbo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

This patent is subject to a terminal disclaimer.

(21) Appl. No.: 16/775,013

(22) Filed: Jan. 28, 2020

(65) Prior Publication Data

US 2020/0169932 A1 May 28, 2020

Related U.S. Application Data

(63) Continuation of application No. 15/774,248, filed as application No. PCT/CN2015/094301 on Nov. 11, 2015, now Pat. No. 10,560,881.

(51) Int. Cl.
*H04W 36/08* (2009.01)
*H04W 36/00* (2009.01)
*H04W 36/30* (2009.01)
*H04W 24/02* (2009.01)

(52) U.S. Cl.
CPC ....... *H04W 36/08* (2013.01); *H04W 36/0061* (2013.01); *H04W 36/30* (2013.01); *H04W 24/02* (2013.01)

(58) Field of Classification Search
CPC . H04W 24/02; H04W 36/0061; H04W 36/08; H04W 36/30
See application file for complete search history.

(56) References Cited

U.S. PATENT DOCUMENTS

| 8,275,377 | B2 | 9/2012 | Nanda et al. |
| 8,391,870 | B1 | 3/2013 | Singh et al. |
| 8,483,749 | B2 | 7/2013 | Jang et al. |
| 8,811,349 | B2 | 8/2014 | Deshpande et al. |
| 9,615,302 | B2 | 4/2017 | Zhi et al. |

(Continued)

FOREIGN PATENT DOCUMENTS

| CN | 1635713 A | 7/2005 |
| CN | 101115293 A | 1/2008 |

(Continued)

OTHER PUBLICATIONS

Understand Wi-Fi Computers/Smartphones/Tablets for 500 Yen, Japan, Gakken Publishing Co. Ltd., Dec. 30, 2014, total 6 pages.

*Primary Examiner* — Minh Trang T Nguyen
(74) *Attorney, Agent, or Firm* — Slater Matsil, LLP

(57) ABSTRACT

Embodiments of the present invention provide an access point handover method and an apparatus. The method includes: sensing, by a terminal, that a currently connected access point cannot satisfy a transmission condition; finding, by the terminal, that at least one access point satisfying the transmission condition exists in access points having names partially the same as that of the currently connected access point; and establishing, by the terminal, a connection to one of the at least one access point satisfying the transmission condition.

20 Claims, 1 Drawing Sheet

---

A terminal senses that a current access point cannot satisfy a transmission condition — 101

The terminal finds that at least one access point satisfying the transmission condition exists in access points associated with the current access point — 102

The terminal establishes a connection to one of the at least one access point satisfying the transmission condition — 103

(56) References Cited

U.S. PATENT DOCUMENTS

| | | | |
|---|---|---|---|
| 10,560,881 B2* | 2/2020 | Ding | H04W 36/0061 |
| 2010/0008285 A1 | 1/2010 | Kuroda | |
| 2010/0303051 A1 | 12/2010 | Umeuchi et al. | |
| 2011/0194532 A1 | 8/2011 | Kakkad | |
| 2014/0185604 A1 | 7/2014 | Kil et al. | |
| 2016/0044705 A1 | 2/2016 | Gao et al. | |
| 2018/0027025 A1 | 1/2018 | Ma et al. | |

FOREIGN PATENT DOCUMENTS

| | | | |
|---|---|---|---|
| CN | 101416548 A | 4/2009 | |
| CN | 101505515 A | 8/2009 | |
| CN | 101622887 A | 1/2010 | |
| CN | 101932054 A | 12/2010 | |
| CN | 103619054 A | 3/2014 | |
| CN | 103686896 A | 3/2014 | |
| CN | 103916934 A | 7/2014 | |
| CN | 103973365 A | 8/2014 | |
| CN | 104125615 A | 10/2014 | |
| CN | 104168561 A | 11/2014 | |
| CN | 204425656 U | 6/2015 | |
| CN | 104902537 A | 9/2015 | |
| JP | 2010021765 A | 6/2010 | |
| JP | 2013021653 A | 1/2013 | |
| JP | 2015040436 A | 3/2015 | |
| WO | 2009104336 A1 | 8/2009 | |

\* cited by examiner

NETWORK HANDOVER METHOD AND APPARATUS

CROSS-REFERENCE TO RELATED APPLICATIONS

This application is a continuation of U.S. patent application Ser. No. 15/774,248, filed on May 7, 2018, which is a national stage of International Application No. PCT/CN2015/094301, filed on Nov. 11, 2015. All of the aforementioned applications are hereby incorporated by reference in their entireties.

TECHNICAL FIELD

The present invention relates to the communications field, and in particular, to a network handover method and an apparatus.

BACKGROUND

With popularity of home broadband and development of routers toward a 5G (fifth generation) technology, it is becoming more common for home users to perform networking by using a dual-band router or two routers. For example, there are the following usage scenarios:

A 5G band has small interference, and provides better surfing experience than a 2.4G network. A 2.4G/5G dual-band router usually supports both a 2.4G hotspot and a 5G hotspot. In this case, a problem that is prone to occur is described as follows. It is assumed that a name of a 2.4G router is AP (Access Point) 2.4G and a name of a 5G router is AP 5G. A user preferably uses a 5G signal. Coverage of a 5G network is small. After the user goes far, because the 5G network is still connected and a terminal can still detect the 5G network even though the 5G signal is very poor, the terminal cannot be handed over to a 2.4G network unless the user manually hands over to the 2.4G network. This causes very poor surfing experience of the user.

SUMMARY

Embodiments of the present invention provide a network handover method and an apparatus, to automatically select a to-be-accessed network, thereby ensuring surfing experience of a user.

The following technical solutions are used in the embodiments of the present invention to achieve the foregoing objective.

According to a first aspect, an embodiment of the present invention provides an access point handover method. The method includes: sensing, by a terminal, that a currently connected access point cannot satisfy a transmission condition. The method further includes finding, by the terminal, that at least one access point satisfying the transmission condition exists in access points having names partially the same as that of the currently connected access point. The method further includes establishing, by the terminal, a connection to one of the at least one access point satisfying the transmission condition.

In a first possible implementation of the first aspect, the transmission condition includes at least one of the following: a strength of a signal received by the terminal is greater than a first threshold; the terminal detects that a packet loss rate for received data is less than a second threshold; a round-trip delay for data transmitted by the terminal is less than a third threshold; and a download rate or an upload rate of the terminal is less than a fourth threshold.

With reference to the first aspect or the first possible implementation of the first aspect, in a second possible implementation, when there is one access point satisfying the transmission condition, before the establishing, by the terminal, a connection to one of the at least one access point satisfying the transmission condition, the method further includes: breaking, by the terminal, a connection to the currently connected access point.

With reference to the first aspect or the first possible implementation of the first aspect, in a third possible implementation, when there are at least two access points satisfying the transmission condition, after the establishing, by the terminal, a connection to one of the at least one access point satisfying the transmission condition, the method further includes: breaking, by the terminal, a connection to the currently connected access point.

According to a second aspect, an embodiment of the present invention provides a terminal. The terminal includes: a communications interface, configured to communicate with an access point. The terminal further includes a processor, configured to: sense that a currently connected access point cannot satisfy a transmission condition. The processor is configured to find that at least one access point satisfying the transmission condition exists in access points associated with the currently connected access point. The processor is configured to establish a connection to one of the at least one access point satisfying the transmission condition. The at least one access point associated with the currently connected access point has a name partially the same as that of the currently connected access point.

In a first possible implementation of the second aspect, the transmission condition includes at least one of the following: a strength of a signal received by the terminal is greater than a first threshold; the terminal detects that a packet loss rate for received data is less than a second threshold; a round-trip delay for data transmitted by the terminal is less than a third threshold; and a download rate or an upload rate of the terminal is less than a fourth threshold.

With reference to the second aspect or the first possible implementation of the second aspect, in a second possible implementation, when there is one access point satisfying the transmission condition, before the processor establishes the connection to the one of the at least one access point satisfying the transmission condition, the following is further included: the processor breaks a connection to the currently connected access point.

With reference to the second aspect or the first possible implementation of the second aspect, in a third possible implementation, when there are at least two access points satisfying the transmission condition, after the processor establishes the connection to the one of the at least one access point satisfying the transmission condition, the following is further included: the processor breaks a connection to the currently connected access point.

According to the network handover method and the apparatus provided in the embodiments of the present invention, when the currently connected access point cannot satisfy a transmission condition, an access point satisfying the transmission condition in the access points having the names partially the same as that of the currently connected access point is searched for. The connection is established to the found access point, thereby implementing automatic handover between different access points and ensuring surfing experience of a user.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A first embodiment of the present invention provides a system. The system includes at least one terminal and at least two access points. The system is applicable to short-range communication. The short-range communication herein may be communication within dozens of meters. The following describes the system in detail.

Figure 2:
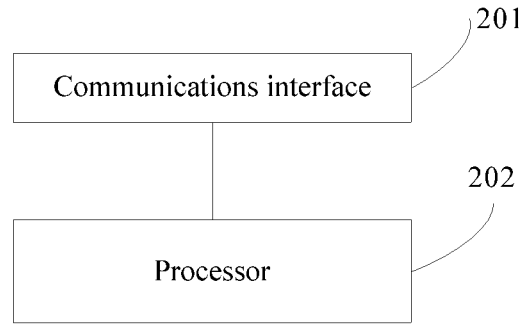
FIG. 2 is a composition structure diagram of a terminal according to an embodiment of the present invention.

The terminal included in the system is connected to one of the at least two access points. As shown in FIG. 2, the terminal includes: a communications interface 201, configured to communicate with the access point. The terminal further includes a processor 202, configured to: sense that the currently connected access point cannot satisfy a transmission condition; find that at least one access point satisfying the transmission condition exists in access points associated with the currently connected access point; and establish a connection to one of the at least one access point satisfying the transmission condition. The at least one access point associated with the currently connected access point has a name partially the same as that of the currently connected access point.

In this way, the terminal can perform handover between the currently connected access point and the access point associated with the currently connected access point. Therefore, a user does not need to manually perform handover, thereby ensuring surfing experience of the user.

The transmission condition includes at least one of the following:

1. A strength of a signal received by the terminal is greater than a first threshold. The first threshold may be −75 db (decibel).

2. The terminal detects that a packet loss rate for received data is less than a second threshold. The second threshold may be 10%.

3. A round-trip delay for data transmitted by the terminal is less than a third threshold. The third threshold may be 100 ms (millisecond).

4. A download rate or an upload rate of the terminal is less than a fourth threshold. The fourth threshold may be 10 kbps (kilobyte per second).

When there is one access point satisfying the transmission condition, in addition to establishing the connection to the one of the at least one access point satisfying the transmission condition, the processor is further configured to break a connection to the currently connected access point.

When there are at least two access points satisfying the transmission condition, in addition to establishing the connection to the one of the at least one access point satisfying the transmission condition, the processor is further configured to break, by the terminal, a connection to the currently connected access point.

When there are at least two access points satisfying the transmission condition, after finding the at least two access points satisfying the transmission condition, the processor first establishes a connection to the at least two access points, determines to connect to one of the at least two access points, and then breaks a connection to another access point connected to the terminal.

A basis used by the processor to determine an access point to which the processor is to connect in the at least two access points is that one or more of the foregoing transmission conditions are satisfied.

That the at least one access point associated with the currently connected access point has a name partially the same as that of the currently connected access point includes the following. The at least one access point associated with the currently connected access point has the name with a prefix the same as that of the name of the currently connected access point. For example, xxx_5G and xxx_24G are associated access points, and a same part xxx_ of the names of the two access points is a prefix of the names of the two access points. That names of access points are partially the same may alternatively mean that suffixes of names of two access points are the same, or any parts of names of two access points are the same.

The at least one access point associated with the currently connected access point may be a preset associated access point. For example, the user may set a router 1 and a router 2 as associated access points in the terminal.

The system further includes the access points. The access point includes: a communications interface, configured to communicate with the terminal; and a processor, configured to establish a connection to the terminal.

Figure 1:
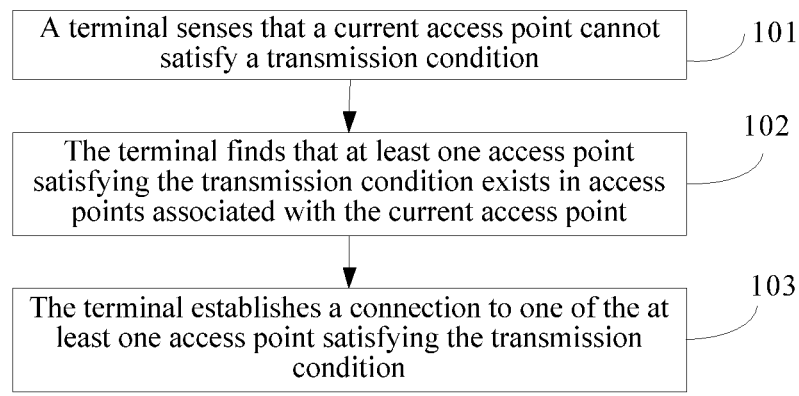
FIG. 1 is a flowchart of an access point handover method according to an embodiment of the present invention.

A second embodiment of the present invention provides an access point handover method. As shown in FIG. 1, the method includes the following steps:

Step 101: A terminal senses that a currently connected access point cannot satisfy a transmission condition.

Step 102: The terminal finds that at least one access point satisfying the transmission condition exists in access points associated with the currently connected access point.

Step 103: The terminal establishes a connection to one of the at least one access point satisfying the transmission condition.

The at least one access point associated with the currently connected access point has a name partially the same as that of the currently connected access point.

In this way, the terminal can perform handover between the currently connected access point and the access point associated with the currently connected access point. Therefore, a user does not need to manually perform handover, thereby ensuring surfing experience of the user.

The transmission condition includes at least one of the transmission conditions in the first embodiment, and details are not described herein again.

When there is one access point satisfying the transmission condition, before the establishing, by the terminal, a connection to one of the at least one access point satisfying the transmission condition, the method further includes: breaking, by the terminal, a connection to the currently connected access point.

When there are at least two access points satisfying the transmission condition, after the establishing, by the terminal, a connection to one of the at least one access point satisfying the transmission condition, the method further includes: breaking, by the terminal, a connection to the currently connected access point.

When there are at least two access points satisfying the transmission condition, after finding the at least two access points satisfying the transmission condition, the terminal first establishes a connection to the at least two access points, determines to connect to one of the at least two access points, and then breaks a connection to another access point connected to the terminal.

A basis used by the terminal to determine an access point to which the terminal is to connect in the at least two access points is that one or more of the foregoing transmission conditions are satisfied.

That the at least one access point associated with the currently connected access point has a name partially the same as that of the currently connected access point includes the following. The at least one access point associated with the currently connected access point has the name with a prefix the same as that of the name of the currently connected access point. For example, xxx_5G and xxx_24G are associated access points, and a same part xxx_ of the names of the two access points is a prefix of the names of the two access points. That names of access points are partially the same may alternatively mean that suffixes of names of two access points are the same, or any parts of names of two access points are the same.

It may be understood by a person skilled in the art that, for the purpose of convenient and brief description, for a detailed working process of the foregoing system, apparatus, and unit, refer to a corresponding process in the foregoing method embodiment, and details are not described herein.

Functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiment may be implemented by a program instructing relevant hardware. The program may be stored in a computer readable storage medium. When the program runs, the steps of the method embodiment are performed. The foregoing storage medium includes: any medium that can store program code, such as a ROM, a RAM, a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system, comprising:
    an electronic device configured to:
        connect to a router via a first access point, the first access point supports 5G communications;
        receive an input operation;
        in response to the input operation, associate the first access point with a second access point, the second access point supports 2.4G communications; and
        automatically connect to the router via the second access point when the first access point does not satisfy a transmission condition, wherein the second access point is determined according to an association relationship between the first access point and the second access point; and
    the router, wherein the router is configured to:
        connect to the electronic device via the first access point; and
        automatically connect to the electronic device via the second access point when the first access point does not satisfy the transmission condition, wherein the router is a 2.4G/5G dual band router, the router comprises the first access point and the second access point
    wherein a prefix of a first name of the first access point is the same as a prefix of a second name of the second access point.

2. The system of claim 1, wherein the transmission condition comprises:
    a strength of a signal received, by the electronic device, is greater than a first threshold;
    a packet loss rate of data received, by the electronic device, is less than a second threshold;
    a round-trip delay of data transmitted, by the electronic device, is less than a third threshold; or
    a download rate or an upload rate of the electronic device is less than a fourth threshold.

3. The system of claim 2, wherein the second access point satisfies the transmission condition.

4. The system of claim 3, wherein the electronic device is further configured to:
    break a connection to the first access point before the electronic device establishes the connection to the second access point.

5. The system of claim 3, wherein the electronic device is further configured to:
    break a connection to the first access point after the electronic device establishes the connection to the second access point.

6. A terminal, comprising:
    a processor; and
    a memory configured to store instructions; and the processor configured to execute the instructions stored in the memory to cause the terminal to:
        connect a first access point;
        receive an input operation;
        in response to the input operation, associate the first access point with a second access point; and
        when the first access point does not satisfy a transmission condition, automatically connect with the second access point, wherein the first access point supports 5G communications, wherein the second access point supports 2.4G communications, wherein the second access point is determined according to an association relationship between the first access point and the second access point, and wherein a prefix of a first name of the first access point is the same as a prefix of a second name of the second access point.

7. The terminal of claim 6, wherein:
    a first router comprises the first access point and the second access point.

8. The terminal of claim 6, wherein the transmission condition comprises:
- a strength of a signal received, by the terminal, is greater than a first threshold;
- a packet loss rate of data received, by the terminal, is less than a second threshold;
- a round-trip delay of data transmitted, by the terminal, is less than a third threshold; or
- a download rate or an upload rate of the terminal is less than a fourth threshold.

9. The terminal of claim 6, wherein the second access point satisfies the transmission condition.

10. The terminal of claim 6, wherein the processor is configured to cause the terminal further to:
- break a connection to the first access point before the terminal establishes the connection to the second access point; or
- break a connection to the first access point after the terminal establishes the connection to the second access point.

11. The terminal of claim 6, wherein a prefix of the first name is the same as a prefix of the second name.

12. A router, comprising:
- a communications interface;
- a processor; and
- a non-transitory computer readable storage medium storing programing for execution by the processor, the programing cause the router to:
  - connect to an electronic device via a first access point;
  - receive an indication for associating the first access point with a second access point;
  - connect to the electronic device via the second access point associated with the first access point when the first access point does not satisfy a transmission condition; and
  - wherein the router comprises the first access point and the second access point, the first access point supports 5G communications, wherein the second access point supports 2.4G communications, wherein a first name of the first access point is at least partially the same as a second name of the second access point, and wherein the second access point is determined according to an association relationship between the first access point and the second access point.

13. The router of claim 12, wherein the transmission condition comprises:
- a strength of a signal received, by the electronic device, is greater than a first threshold;
- a packet loss rate of data received, by the electronic device, is less than a second threshold;
- a round-trip delay of data transmitted, by the electronic device, is less than a third threshold; or
- a download rate or an upload rate of the electronic device is less than a fourth threshold.

14. The router of claim 13, wherein the second access point satisfies the transmission condition.

15. The router of claim 12, wherein the processor is configured to cause the router further to break a connection to the first access point before the router connects to the electronic device via the second access point.

16. The router of claim 12, wherein a prefix of the first name is the same as a prefix of the second name.

17. The router of claim 12, wherein the processor is configured to cause the router further to:
- break a connection to the first access point after the router connects to the electronic device via the second access point.

18. A non-transitory computer readable storage medium comprising instructions to cause an electronic device to:
- connect a first access point, wherein the first access point supports 5G communications;
- receive an input operation;
- in response to the input operation, associate the first access point with a second access point, wherein the second access point supports 2.4G communications; and
- when the first access point does not satisfy a transmission condition, automatically connect with the second access point associated with the first access point, wherein the second access point is determined according to an association relationship between the first access point and the second access point, and wherein a prefix of a first name of the first access point is the same as a prefix of a second name of the second access point.

19. The non-transitory computer readable storage medium of claim 18, wherein the transmission condition comprises:
- a strength of a signal received, by the electronic device, is greater than a first threshold;
- a packet loss rate of data received, by the electronic device, is less than a second threshold;
- a round-trip delay of data transmitted, by the electronic device, is less than a third threshold; or
- a download rate or an upload rate of the electronic device is less than a fourth threshold.

20. The non-transitory computer readable storage medium of claim 19, wherein the second access point satisfies the transmission condition.

* * * * *